United States Patent
Liao et al.

(10) Patent No.: US 11,348,012 B2
(45) Date of Patent: May 31, 2022

(54) SYSTEM AND METHOD FOR FORMING PREDICTIONS USING EVENT-BASED SENTIMENT ANALYSIS

(71) Applicant: Refinitiv US Organization LLC, New York, NY (US)

(72) Inventors: Wenhui Liao, Eagan, MN (US); Masoud Makrehchi, Markham (CA); Sameena Shah, White Plains, NY (US)

(73) Assignee: Refinitiv US Organization LLC, New York, NY (US)

(*) Notice: Subject to any disclaimer, the term of this patent is extended or adjusted under 35 U.S.C. 154(b) by 975 days.

(21) Appl. No.: 13/967,301

(22) Filed: Aug. 14, 2013

(65) Prior Publication Data

US 2014/0052684 A1    Feb. 20, 2014

Related U.S. Application Data

(60) Provisional application No. 61/683,375, filed on Aug. 15, 2012.

(51) Int. Cl.
 *G06N 5/02*  (2006.01)
 *G06F 40/30* (2020.01)

(52) U.S. Cl.
 CPC ............. *G06N 5/02* (2013.01); *G06F 40/30* (2020.01)

(58) Field of Classification Search
 CPC ...................................................... G06N 5/02
 See application file for complete search history.

(56) References Cited

U.S. PATENT DOCUMENTS

| | | |
|---|---|---|
| 6,938,068 B1 | 8/2005 | Kraft et al. |
| 7,249,080 B1 | 7/2007 | Hoffman et al. |
| 7,356,484 B2 | 4/2008 | Benjamin et al. |
| 7,539,637 B2 | 5/2009 | Gatto |
| 7,636,680 B2 | 12/2009 | Gatto |
| 7,711,623 B2 | 5/2010 | Smith et al. |
| 7,877,309 B2 | 1/2011 | Gatto et al. |
| 7,890,408 B2 | 2/2011 | Menchero et al. |
| 2006/0036694 A1 | 2/2006 | Pricken et al. |
| 2006/0195383 A1 | 8/2006 | Masuda |
| 2006/0242040 A1 | 10/2006 | Rader |
| 2007/0282730 A1 | 12/2007 | Carpenter et al. |
| 2008/0086363 A1 | 4/2008 | Kass et al. |
| 2008/0189634 A1 | 8/2008 | Tevanian et al. |
| 2009/0138411 A1* | 5/2009 | O'Callahan ............ G06Q 40/06 705/36 R |

(Continued)

OTHER PUBLICATIONS

Bollen, Johan, Huina Mao, and Xiaojun Zeng. "Twitter mood predicts the stock market." Journal of Computational Science 2.1 (2011): 1-8.*

(Continued)

*Primary Examiner* — Kevin W Figueroa
(74) *Attorney, Agent, or Firm* — Faegre Drinker Biddle & Reath LLP

(57) ABSTRACT

In embodiments, a sentiment analyzer identifies a first event and accesses a first set of messages. The sentiment analyzer associates the first set of messages with the first event and analyzes the messages to identify a set of sentiment features. The set of sentiment features is used to analyze a second set of messages to form a prediction associated with a second event. The prediction may be used to facilitate an event-related service.

1 Claim, 4 Drawing Sheets

(56) References Cited

U.S. PATENT DOCUMENTS

| | | | |
|---|---|---|---|
| 2010/0114795 A1 | 5/2010 | Hudson et al. | |
| 2010/0179930 A1 | 7/2010 | Teller et al. | |
| 2010/0262454 A1 | 10/2010 | Sommer et al. | |
| 2011/0112825 A1 | 5/2011 | Bellegarda | |
| 2011/0137906 A1 | 6/2011 | Cai et al. | |
| 2011/0296004 A1 | 12/2011 | Swahar | |
| 2012/0059771 A1* | 3/2012 | von Groll | G06Q 40/04 705/36 R |
| 2012/0136985 A1 | 5/2012 | Popescu et al. | |
| 2012/0191596 A1 | 7/2012 | Kremen et al. | |
| 2012/0246104 A1* | 9/2012 | Di Sciullo | G06Q 50/01 706/46 |
| 2012/0296845 A1* | 11/2012 | Andrews | G06F 17/2785 705/36 R |
| 2013/0191380 A1* | 7/2013 | Artzt | G06F 17/3053 707/727 |

OTHER PUBLICATIONS

Feldman, Ronen, et al. "The stock sonar—sentiment analysis of stocks based on a hybrid approach." Twenty-Third IAAI Conference. 2011. (Year: 2011).*
"Notification of Transmittal of the International Search Report and the Written Opinion of the International Searching Authority, or the Declaration". International Application No. PCT/US14/27345. 25 pages. International Filing Date: Mar. 14, 2014, dated Jul. 17, 2014.
C. Oh and O. Sheng, "Investigating predictive power of stock micro blog sentiment in forecasting future stock price directional movement," ICIS, pp. 57-58, 2011.
CC. Hsieh, et al., "Experts vs.the crowd: Examining popular news prediction performance on twitter," International Conference on WWW, 2013.
E. Gilbert and K. Karahalios, "Widespread worry and the stock market," International AAAI Conference on Weblogs and Social Media, pp. 58-65, 2010.
E. J. Ruiz, et al. "Correlating financial time series with microblogging activity," International Conference on Web Search and Data Mining, WSDM '12, pp. 513-522, 2012.
J. Bollena, et al., "Twitter mood predicts the stock market," Journal of Computational Science, 2(1):1-8, 2011.
J. Lehmann, et al. "Finding news curators in twitter," International World Wide Web Conference Committee, pp. 863-870, 2013.
N. K. Sharma, et al., "Inferring who-is-who in the twitter social network," SIGCOMM Computer Communication Review, 42(4), pp. 533-538, 2012.
R. Bandari, et al. "The pulse of news in social media: Forecasting popularity," Proceedings of the Sixth International AAAI Conference on Weblogs and Social Media, pp. 26-33, 2012.
S. Kumar, et al., "Whom should I follow? Identifying relevant users during crisis," Proceedings of the 24th ACM Conference on Hypertext and Social Media, pp. 39-147, May 1, 2013, ACM New York, NY, USA.
T. Wilson, et al., "Opinionfinder: A system for subjectivity analysis," HLT-Demo '05 Proceedings of HLT/EMNLP on Interactive Demonstrations, pp. 34-35, Oct. 7, 2005, Association for Computational Linguistics, Stroudsburg, PA, USA.
W. Liao, et al., Winning by Following the Winners: Mining the Behavior of Stock Market Experts in Social Media. Social Computing, Behavioral-Cultural Modeling and Prediction. Lecture Notes in Computer Science vol. 8393, 2014, pp. 103-110.
X. Zhang, et al., "Predicting stock market indicators through twitter I hope it is not as bad as I fear." Procedia—Social and Behavioral Sciences, 2011 26:55-62.
International Search Report and Written Opinion issued in PCT/US2013/054992, dated Mar. 11, 2014, 15 pages.
M. Makrehchi, et al., "Stock prediction using event-based sentiment analysis," IEEE/WIC/ACM International Conferences on Web Intelligence (WI) and Intelligent Agent Technology (IAT), 6 pages.
International Application No. PCT/US2013/054992. "System and Method for Determining and Utilizing Successful Observed Performance". International Preliminary Report on Patentability. International Filing Date: Aug. 14, 2013, dated Feb. 26, 2015.
European Application No. EP13829264. "Supplementary European Search Report" European Patent Office. 1 page. Place of Search: Berlin. Date of Search Completion: May 31, 2016, dated Jun. 8, 2016.
European Application No. EP13829264. "European Search Opinion". CF Form 1507. 5 pages, dated Jun. 8, 2016.

* cited by examiner

SYSTEM AND METHOD FOR FORMING PREDICTIONS USING EVENT-BASED SENTIMENT ANALYSIS

CROSS-REFERENCE TO RELATED APPLICATIONS

This application claims the benefit of, and expressly incorporates by reference and in its entirety, U.S. Provisional Application No. 61/683,375, filed on Aug. 15, 2012. This application is related to U.S. application Ser. No. 13/836,520, filed on Mar. 15, 2013.

BACKGROUND

Public mood and market performance are correlated such that, e.g., when people are happy, optimistic, and in a good mood, they are more likely to increase investment, which in turn improves stock market performance. Thus, it follows that market events may be predictable based on public sentiment of various types and degrees. The same correlation may be true for various types of events that affect, and/or are affected by, public sentiment.

SUMMARY

Embodiments of the present invention facilitate forming predictions associated with events based on sentiment (particularly, for example, words and phrases relating to such sentiment) detected in user messages. For example, embodiments of the present invention relate to mining messages provided over networks for sentiment representative of user moods, emotions, and impressions associated with events. Events that have occurred are identified and messages that are generated around the time of the occurrence of the events are associated with the events. These events may be qualified as, e.g., gain events (e.g., the value of an item of interest has increased) or loss events (e.g., the value of the item has decreased). Thus, messages occurring at about the time of an occurrence of a gain event may be automatically deemed indicative of positive sentiment, and the same concept can be applied to loss events and associated messages.

Upon receipt by embodiments of the present invention, these messages can be analyzed to identify a set of sentiment features (e.g., "hooray" and "awesome" for, typically, a gain event) that may be stored in a dynamic dictionary. This dynamic dictionary may then be used to identify sentiments in subsequently received messages, and therefore used to form predictions associated with events. These predictions may be used to provide event-related services such as, for example, securities trading strategies and recommendations.

In particular, some embodiments of the invention include a method for forming a prediction associated with an event. In embodiments, the method includes accessing event information from an event information source and identifying a first event based on event criteria and the event information. A first set of messages is accessed from a message source, and is associated with the first event. Embodiments further include identifying a set of sentiment features by analyzing the first set of messages based on the first event. The set of sentiment features may include at least one text feature representing a user sentiment associated with the first event. The set of sentiment features may be stored in a dynamic dictionary in a computer memory. Embodiments of the method also include accessing a second set of messages from the message source, and analyzing the second set of messages, based on the set of sentiment features, to form a prediction associated with a second event. The prediction may also be stored in the memory.

Embodiments of the invention include another method for forming a prediction associated with an event. Embodiments of the method include accessing a set of messages from a message source and accessing a dynamic dictionary stored in a computer memory. The dynamic dictionary may include a set of sentiment features. The set of sentiment features may include at least one text feature representing a user sentiment associated with a first event. Embodiments of the method also include analyzing the set of messages, based on the set of sentiment features, to form a prediction associated with a second event and storing the prediction in the computer memory.

In embodiments, a system for forming predictions associated with events includes a server configured to receive, from a message source, messages generated by messaging users. The server includes a processor that instantiates a number of software components stored in a memory. In embodiments, the software components include a sentiment analyzer configured to identify a set of sentiment features by analyzing, based on a first event, a first set of the messages. The sentiment analyzer may also be configured to analyze a second set of the messages to form a prediction associated with a second event. In embodiments, the system also includes a services component configured to facilitate an event-related service based on the prediction.

Figure 1:
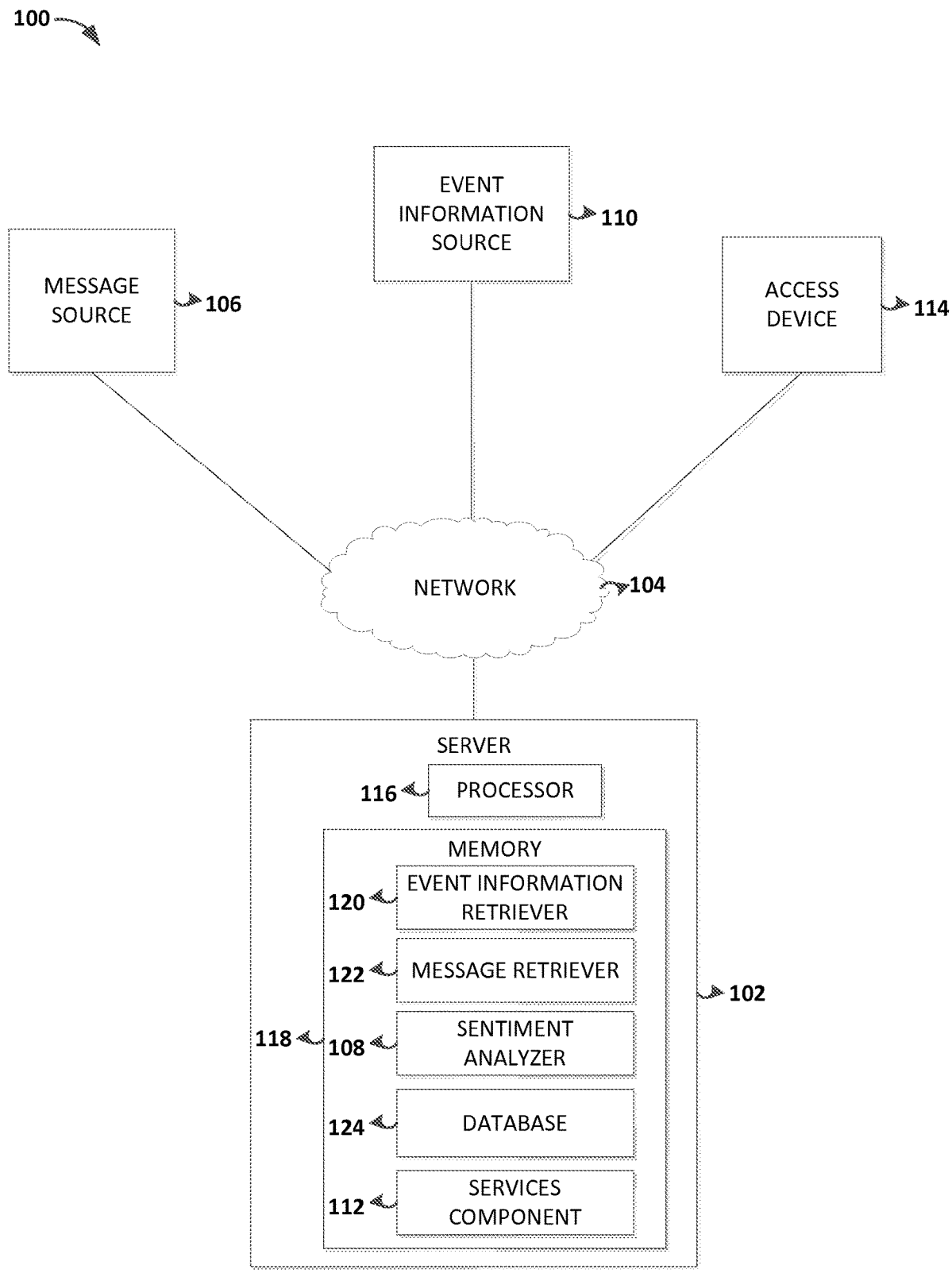
FIG. 1 is a block diagram illustrating an operating environment (and, in some embodiments, aspects of the present invention) in accordance with embodiments of the present invention.

While the present invention is amenable to various modifications and alternative forms, specific embodiments have been shown by way of example in the drawings and are described in detail below. The present invention, however, is not limited to the particular embodiments described. On the contrary, the present invention is intended to cover all modifications, equivalents, and alternatives falling within the ambit of the present invention as defined by the appended claims.

Although the term "block" may be used herein to connote different elements of illustrative methods employed, the term should not be interpreted as implying any requirement of, or particular order among or between, various steps disclosed herein unless and except when explicitly referring to the order of individual steps.

DETAILED DESCRIPTION

Users of communication platforms often generate messages about events such as, for example, stock price changes, outcomes of sports games and horse races, quality or success of retail products or entertainment (e.g., movies), and the like. Many of the messages generated by users include text that may suggest sentiments representative of general moods, optimism, pessimism, impressions, and the like. Users often make references associated with such events through any number of a variety of types of messages such as, for example, social media messages, emails, short message service (SMS) messages, blog posts, web-published articles, and the like. According to embodiments, these messages may be analyzed to form predictions associated with events.

A prediction associated with an event may include, for example, a prediction of the occurrence of the event, a prediction of the time of the occurrence of the event, a prediction regarding the impact or consequence of the event, and/or the like. Embodiments of the invention may be implemented to form predictions associated with any type of event involving a quantifiable metric such as, for example, stock price movement, oil price movement, earnings announcements, other macro-economic events, retail product success, box-office success, and the like. These predictions may, for example, facilitate development of strategies and/or courses of action corresponding to future events. For instance, a prediction that a particular stock price will soon rise significantly may be useful to facilitate preparations for buying the stock before the rise. The predictions may be used to provide recommendations to consumers, to generate event-related products, and the like.

Although the term "event" may relate to any type of event involving a quantifiable metric, the particular example of stock price movement (e.g., an increase or decrease in the price of a company stock that is traded on a securities market) will be used throughout this disclosure to illuminate various aspects of embodiments of the present invention. References to stock price changes, in lieu of other types of events, are not meant to imply any limitation of the scope of the term "event," but are used solely for purposes of clarity.

In the context of the securities example, embodiments of the invention may involve monitoring the performance of a stock (or a group of stocks) to help build training data that also includes event information and user messages. The training data may be used for supervised learning of sentiment corresponding to increases and decreases in the price of the stock (or group of stocks). A classifier or other model may be used to develop a dynamic dictionary of sentiment features, which may be used to identify sentiments of subsequent messages, as they are received. A sentiment score may be determined based on an aggregation of the identified sentiments, and may be used to form predictions associated with the future performance of the stock.

FIG. 1 depicts an example of an operating environment 100 (and, in some embodiments, aspects of the present invention) in accordance with embodiments of the present invention. As shown in FIG. 1, the operating environment 100 includes a server 102 that accesses messages, via a network 104, from a message source 106. The network 104 may be, or include, any number of different types of communication networks such as, for example, a short messaging service (SMS), a local area network (LAN), a wireless LAN (WLAN), a wide area network (WAN), the Internet, and/or the like. The message source 106 may include, for example, the Internet, an email provider, a social media platform, a website, and/or the like. According to embodiments, the server 102 implements a sentiment analyzer 108 that uses the accessed messages to form predictions associated with events.

The sentiment analyzer 108 may utilize event information obtained from an event information source 110 to define event criteria, identify events, develop training data, and/or the like. The event information source 110 may include, for example, a news provider, a statistics provider, a market data provider, a company website, and/or the like. The server 102 may use the predictions to facilitate any number of event-related services such as, for example, by utilizing a services component 112, which a consumer of the services may access with an access device 114.

As shown in FIG. 1, the server 102 may be implemented on a computing device that includes a processor 116 and a memory 118. The sentiment analyzer 108 may be stored in the memory 118. In embodiments, the processor 116 executes the sentiment analyzer 108, which may facilitate analysis of event information and messages to develop predictive models. As indicated above, these messages may include any number of different types of communications provided by messaging users over the network 104 such as, for example, social media messages, emails, SMS messages, blog posts, web-published articles, and/or the like. Social media messages may include any number of different types of communications (e.g., micro-text) provided by users through a social media platform. Social media platforms may include, for example, platforms that enable users to share information with other users and groups of users (e.g., through virtual communities and networks) and include platforms such as Facebook®, Twitter®, LinkedIn®, Foursquare®, StockTwits®, and the like. Social media messages may include, for example, "likes," wall posts, "follows," tweets, re-tweets, replies, and the like.

Still referring to FIG. 1, the server 102 includes an event information retriever 120 that obtains, copies, or otherwise accesses event information from the event information source 110, and a message retriever 122 that obtains, copies, or otherwise accesses messages from the message source 106. The event information retriever 120 may store the content, portions of the content, and/or information extracted from the content in the memory 118 and may, for example, index the content using a database 124. Similarly, the message retriever 122 may store the messages, portions of the messages, and/or information extracted from the messages in the memory 118 and may, for example, index the messages using the database 124. The database 124, which may refer to one or more databases, may be, or include, one or more tables, one or more relational databases, one or more multi-dimensional data cubes, and/or the like. Further, though illustrated as a single component implemented in the memory 118, the database 124 may, in fact, be a plurality of databases 124 such as, for instance, a database cluster, which may be implemented on a single computing device or distributed between a number of computing devices, memory components, and/or the like.

In operation, the sentiment analyzer 108 accesses event information (e.g., from the memory 118 or the event information retriever 120) and, using the event information, identifies an event based on event criteria. As used herein, the term "based on" is not meant to be restrictive, but rather indicates that a determination, identification, prediction, calculation, or the like, is performed by using, at least, the term following "based on" as an input. For example, a sentiment analyzer 108 that identifies an event based on a particular event criterion may also base the identification on another event criterion.

Having identified the event, the sentiment analyzer 108 accesses a set of messages (e.g., from the memory 118 or the message retriever 122) and associates the set of messages with the event. In embodiments, the sentiment analyzer 108 accesses and associates messages with the event according to a search query performed on messages that originated during a particular time period such as a period of time (e.g., one day) before the occurrence of the event, after the occurrence of the event, and/or during the occurrence of the event. In embodiments, the event information retriever 120 and/or the message retriever 122 may include, or interact with, a search function such as, for example, an application programming interface (API), a search engine, and/or the like. For example, tweets may be accessed using the Twitter® Search API. In the securities example, for instance, queries may be developed that include a number of terms that may be used to refer to a specific company on Twitter®. For example, for Apple® Inc., a search query may include "Apple Inc", "Apple", "AAPL", "#AAPL", and "$AAPL", and tweets containing those terms would be associated with the event. Although the query may not be guaranteed to return all of the relevant tweets, some amount of noise may be tolerable due to aggregation of messages and sentiments.

According to embodiments, the sentiment analyzer 108 develops and maintains a dynamic dictionary that includes one or more sets (e.g., vectors) of features such as sentiment features. Sentiment features may include, for example, text features that express a user sentiment (e.g., representation of mood, feeling, emotion, impression, etc.) associated with an event, and/or metadata features. Metadata features may include, for example, identifications of the existence of certain notations, origination times associated with messages, and the like. The sentiment analyzer 108 generates the set of sentiment features by analyzing the messages in the context of the event.

In embodiments, the predictions may be used to facilitate one or more services by using an established dynamic dictionary. Aspects of the services may be provided using the services component 112 which may include, for example, applications, service functions, and/or the like, that provide predictions associated with one or more future events, recommendations regarding strategic decisions, (which could be, e.g., based upon one or more predictions), information for generating products, and/or the like. Additionally, the server 102 may facilitate (e.g., by providing information) generation of products based on predictions and/or may provide predictions to other entities for use in generating event-related products and/or services. In embodiments, for example, securities-related predictions may be used to generate recommendations and strategies for building, developing, and/or managing securities portfolios, funds (e.g., exchange traded funds (ETFs)), and/or the like. In embodiments, the server 102 may provide wagering recommendations to booking agencies, and/or the like.

According to embodiments, various components of the operating environment 100, illustrated in FIG. 1, may be implemented on one or more computing devices. For example, each of the server 102, the message source 106, the event information source 110, and the access device 114 may be, or reside in, one or more computing devices. A computing device may include any type of computing device suitable for implementing embodiments of the invention. Examples of computing devices include specialized computing devices or general-purpose computing devices such "workstations," "servers," "laptops," "desktops," "tablet computers," "hand-held devices," and the like, all of which are contemplated within the scope of FIG. 1 with reference to various components of the operating environment 100.

In embodiments, a computing device includes a bus that, directly and/or indirectly, couples the following devices: a processor, a memory, an input/output (I/O) port, an I/O component, and a power supply. Any number of additional components, different components, and/or combinations of components may also be included in the computing device. The bus represents what may be one or more busses (such as, for example, an address bus, data bus, or combination thereof). Similarly, in embodiments, the computing device may include a number of processors, a number of memory components, a number of I/O ports, a number of I/O components, and/or a number of power supplies. Additionally any number of these components, or combinations thereof, may be distributed and/or duplicated across a number of computing devices.

In embodiments, the memory 118 includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical and holographic media; magnetic cassettes, magnetic tape, magnetic disk storage and other magnetic storage devices; data transmissions; and any other medium that can be used to store information and can be accessed by a computing device such as, for example, quantum state memory, and the like. In embodiments, the memory 118 stores computer-executable instructions for causing the processor 116 to implement aspects of embodiments of system components discussed herein and/or to perform aspects of embodiments of methods and procedures discussed herein. Computer-executable instructions may include, for example, computer code, machine-useable instructions, and the like such as, for example, program components capable of being executed by one or more processors associated with a computing device. Examples of such program components include the sentiment analyzer 108 (and the components thereof, illustrated in FIG. 2 and described below), the services component 112, the event information retriever 120, the message retriever 122, the database 124, and the web server 210 (illustrated in FIG. 2). Some or all of the functionality contemplated herein may also be implemented in hardware and/or firmware.

The illustrative operating environment 100 shown in FIG. 1 is not intended to suggest any limitation as to the scope of use or functionality of embodiments of the present invention. Neither should the illustrative operating environment 100 be interpreted as having any dependency or requirement related to any single component or combination of components illustrated therein.

Figure 2:
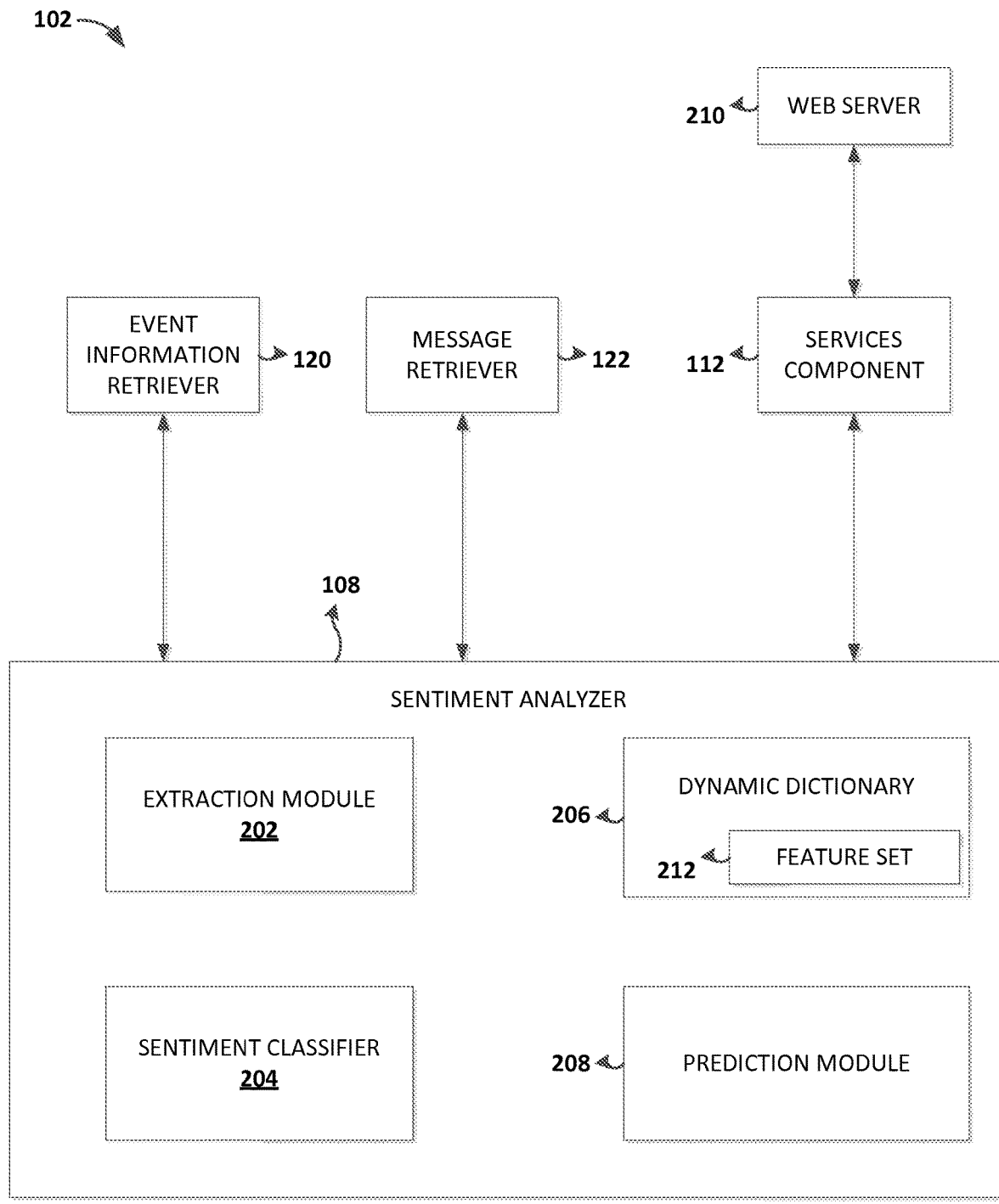
FIG. 2 is a block diagram depicting components of the server shown in FIG. 1 in accordance with embodiments of the present invention.

FIG. 2 is a block diagram depicting components of the server 102 (shown in FIG. 1) in accordance with embodiments of the present invention. As indicated above, the sentiment analyzer 108 may be configured to analyze messages accessed by the message retriever 122 to form predictions associated with events. Results of the analyses may be used to facilitate providing services to consumers (e.g., by making the results of the analyses available). For example, a web server 210 may be used to provide one or more web pages accessible by an access device 114. As shown in FIG. 2, the sentiment analyzer 108 may include an extraction module 202, a sentiment classifier 204, a dynamic dictionary 206, and a prediction module 208. According to embodiments, any one or more of the components 202, 204, 206, and 208 of the sentiment analyzer 108 depicted in FIG. 2 may share resources with, or be integrated with, various ones of the other components depicted therein (and/or components not illustrated). Additionally, any one or more of the components 202, 204, 206, and 208 may reside on the server 102 or the access device 114, or may be distributed between the server 102 and the access device 114.

According to embodiments, the event information retriever 120 obtains, copies, or otherwise accesses event information and collects attributes associated with the information such as, for example, an identification of the event information source 110 from which the event information was accessed, the date and time that the event information was created, and the date and time that the event referenced in the information occurred.

According to embodiments, the extraction module 202 is configured to extract labels (e.g., "positive", "negative", "+1", "−1") from event information and use the extracted labels to generate training data for training prediction models such as classifiers. The extraction module 202 may identify, within the event information, one or more events. To identify events, the extraction module 202 may utilize event criteria such as, for example, one or more sets of rules, classifiers, and/or the like. For example, the extraction module 202 may identify events based on a change in status or condition of an item or entity, a list of qualifying events, and/or the like. In the securities example, stock price events may be identified based an amount of increase or decrease that exceeds a threshold, which, in embodiments, may be based on a comparison value such as another stock, a market index (e.g., a stock market index, a market sector index, etc.), and/or the like. Some examples of stock market indices include the S&P 500, the AMEX Composite, the NASDAQ Global Market Composite, the NYSE Composite, the Russell 1000, and the Wilshire 5000. Similarly, some examples of market sector indices include the Dow Industrials, the KBW Bank Index, the NASDAQ Financial-100, the PHLX Chemicals Sector, the Russell 1000 Growth, and the SIG Energy MLP Index.

For example, suppose $t_o$ and $t_c$ are the opening and closing time, on a given day, of a particular stock, and $t_c-t_o=8$ represents the official market operation hours. Additionally, suppose $r_{sp}$ is the return associated with the S&P 500 for the time frame defined by $t_c-t_o$, and $F(t_o)$ and $F(t_c)$ are the opening and closing price of the stock, respectively. Positive and negative events may be defined, respectively, as a gain event and a loss event, where a gain event may be identified when $(F(t_c)-F(t_o))/F(t_o)>3.0\%+r_{sp}$ and a loss event may be identified when $(F(t_c)-F(t_o))/F(t_o)<-3.0\%-r_{sp}$. That is, in this example, on a given day, if the return for the stock is within 3% of the return for the S&P 500, there is no identified event. However, if the stock price experiences a net gain and that gain is higher than the return for the S&P 500 by more than 3%, a gain event is identified; whereas, if the stock price experiences a net loss for the day and that loss is lower than the return for the S&P 500 by more than 3%, a loss event is identified. According to embodiments, any number of different thresholds, comparisons, and/or relationships may be used as criteria for identifying events.

According to embodiments, the message retriever 122 obtains, copies, or otherwise accesses messages and collects attributes associated with each message such as, for example, an identification of the messaging platform from which the message was accessed, the date and time that the message was created, and content (e.g., text, hyperlinks, uniform resource locators (URLs), charts, graphs, images, and/or the like) included in the message. Additionally, in embodiments, other attributes specific to a messaging platform may be collected. For example, for messages sent via Twitter® (e.g., tweets), the message retriever 122 may collect properties such as hashtags, mentions, replies, favorites, re-tweets, identifications of followers, and/or the like. As another example, for messages sent via Facebook®, the message retriever 122 may collect properties such as "likes," posts, indications of "status," links, friends, and/or the like.

In addition to accessing event information as described above, in embodiments of the present invention, the extraction module 202 also accesses a set of messages that correspond to the event criteria. To identify these messages, the extraction module 202 may utilize, for example, one or more sets of rules, classifiers, and/or the like. According to embodiments, the extraction module 202 utilizes a set of simple rules to maximize efficiency, thereby enabling expeditious identification of events and messages to facilitate services that "keep up with" the nearly real-time speed of various markets and messaging behaviors. For example, the extraction module 202 may access messages that were generated during a certain period of time before the occurrence of the event, after the occurrence of the event, during the occurrence of the event, or combination of these. The period of time may be, for example, a number of hours, days, or weeks, and may be optimized based on the output of a classifier. In embodiments, all of the available messages from a message source 106 for a particular time period may be accessed, while in other embodiments, the extraction module 202 may access certain messages, such as those more likely to be relevant to the event. For example, the extraction module 202 may identify messages by identifying certain types of content in the messages such as, for example, content that appears to be associated with events, items or entities related to events, event-related activities, character strings that are commonly associated with one or more event-related activities, and/or the like.

The extraction module 202 is configured to associate the set of messages with the event and identify a set 212 of sentiment features by analyzing the messages based on the event. The set 212 of sentiment features may include text features representing user sentiments associated with the event and may be stored in the dynamic dictionary 206 in the memory 118 (and may be indexed, e.g., in the database 124 shown in FIG. 1). The dynamic dictionary 206 may include any number of sets 212 of sentiment features, which may include feature vectors, word lists, and the like. To generate the set 212 of sentiment features, the sentiment analyzer 108 may use the automatically-generated training data to recognize patterns, develop regression models, and/or the like.

In embodiments, as shown in FIG. 2, such a model may include a sentiment classifier 204. The sentiment classifier 204 may be, or include, one or more supervised or unsupervised statistical classifiers configured to classify messages according to sentiments. The extraction module 202 may utilize a support vector machine (SVM) that analyzes features such as list-based features (e.g., whether a character sequence is included within a positive/negative sentiment word list), unigram and bigram word features, and/or the like. In embodiments, Rocchio classifiers may be used. The classification may be based, for example, on sentiment detected in messages associated with an event. For example, the extraction module 202 may use the training data to train a supervised sentiment classifier 204. To do so, the extraction module 202 may assign, based on the event criteria, a label to each of the set of messages to create a set of labeled messages, where each label corresponds to a predetermined sentiment value. These labeled messages may be used to train the classifier 204.

In embodiments, the label assigned to each of the messages in a set associated with an event may be the same, thereby facilitating automatic labeling of the messages. The labels may be binary, discrete, quantitative, qualitative, and/or the like. In embodiments, for example, the label may be a positive or negative sign, representing positive and negative sentiment, respectively. In this manner, the classifier may learn to recognize certain patterns of characters, words, phrases, special notations, and/or the like, that express positive and negative sentiment. In embodiments, messages may be labeled with temporal sentiment, such as whether a user expects, experiences, or recalls a positive or negative sentiment. According to embodiments, in addition to the positive and negative features, a classifier 204 may be trained using features based on metadata associated with each message. For example, tweets may be classified based on the existence of hashtags, stock ticker symbols, URLs, re-tweets, and/or the like. In some cases, training data may be unbalanced (e.g., it may include more positive examples than negative examples or vice-versa). In such cases, an over-sampling technique at the feature level may be employed. For example, if there are half as many positively-labeled messages as there are negatively-labeled messages, the number of positive features in the generated feature vector may be two times the number of negative features, thereby balancing the representation of minority labels in the training process.

For instance, with respect to the securities example, it has been observed that, in general, significant stock price fluctuations can affect people's moods, and people's moods in turn can affect the stock market. Thus, embodiments of the invention harness the idea that when a stock price increases by a certain amount relative to the overall stock market or a particular index (e.g., the S&P 500), the social media messages related to the stock generally reflect a positive mood; and similarly, when a stock price decreases by a certain relative amount, the related social media messages generally reflect a negative mood. The extraction module 202 may use the stock price changes to label a message's sentiment as either positive or negative.

In embodiments, other positive and negative events may be used to label messages for training securities prediction classifiers. For example, corporate earnings may cause significant stock price movement and also may trigger observable public sentiment. Other events such as merger-and-acquisition announcements, macro-economic events such as monthly job reports, monetary policy announcements, and the like, can all influence stock markets and public sentiment, and thus may be used to label messages.

As indicated above, the extraction module 202 may utilize any number of different techniques for learning sentiment such as, for example, classification, regression, correlation analysis, pattern analysis, and/or the like. Any number of various combinations of the foregoing may also be employed. For example, it has been observed that a Twitter® time series often includes autocorrelation, which may be attributable to human emotions that may be dependent on recent past human emotions. The extraction module 202 may use an autoregressive model to account for this type of historical dependence such as, for example, the following model:

$$SPX_{return}(1) \sim class(-1) + class(-2) + class(-3) + pos(0) + neg(0) + class(0) + SPX_{return}(-1) + SPX_{return}(-2) - 1;$$

where $SPX_{return}(t)$ represents the daily arithmetic return, defined as ((opening value/closing value)−1), of the S&P 500 on day t. The regression may be run daily, where the present day is denoted as day 0. In the example above, t=−1 represents one trading day before day 0, pos(t) denotes daily aggregated positivity of the twitter series on day t, neg(t) denotes daily aggregated negativity of the series, class(t) denotes the net positivity or negativity on day t (which may, e.g., include magnitudes, be represented as "+1" or "−1", etc.), and the constant factor (−1) is used for removing the intercept. In embodiments, each day, a training set from the last 10 days may be collected and used in the regression model. According to embodiments, any number of different autoregressive models may be used to account for autocorrelation.

As indicated above, the sentiment classifier 204 may be used to identify one or more sets 212 of sentiment features, which may be maintained in a dynamic dictionary 206. The prediction module 208 may be configured to use the dynamic dictionary 206 to identify sentiment associated with subsequently received messages, and to use the identified sentiments to form predictions associated with possible future events. The prediction module 208 may utilize information generated by the classifier 204, information from an objective information source (e.g., the event information source 110 shown in FIG. 1), and/or other information to facilitate forming predictions. In embodiments, the predictions may be utilized by the services component 112, provided to consumers, and/or the like.

In an illustrative implementation, for example, embodiments of the sentiment analyzer described herein (e.g., the sentiment analyzer 108 shown in FIG. 1) may be used to predict when the price of Thomson Reuters stock is poised to increase or decrease. In this implementation, the sentiment analyzer may be configured to identify, based on event criteria, a positive event and a negative event associated with the stock. For instance, a positive event may be characterized by a trading day during which the relative increase of the price of the stock exceeds 3 percent more than the relative increase of the S&P 500 index. Similarly, a negative event may be characterized by a trading day during which the relative decrease of the price of the stock exceeds 3 percent more than the relative decrease of the S&P 500 index. For each event, a message retriever (e.g., the message retriever 122 shown in FIG. 1) may use a search query (e.g., "Thomson OR TR OR TRI OR Reuters OR #TRI OR $TRI") to retrieve a set of potentially relevant tweets from the day before the event. That is, a first set of messages may include all of the tweets that originated the day before a positive event and that satisfy the search query. Similarly, a second set of messages may include all of the tweets that originated the day before a negative event and that satisfy the search query.

The sentiment analyzer may then associate the first set of messages with the positive event and the second set of messages with the negative event. Because all of the first set of messages occurred a day before the price of Thomson Reuters stock increased, the sentiment analyzer may label each message of the first set of messages as positive (e.g., by indicating a positive sentiment with a "+1") and, similarly, may label each message of the second set of messages as negative (e.g., by indicating a negative sentiment with a "−1"). These sets of positive and negative labeled messages may then be used to train a supervised classifier to identify positive and negative sentiment in future tweets. In doing so, the classifier may learn to associate various sentiment features, for example, various words and phrases (e.g., "yes", "dynamite", "TRI is hot", "Thomson looking good", "good day for TRI", etc.) with positive sentiment and other words and phrases (e.g., "yuck", "no", "dumping TRI", "Thomson struggling", "bad day for TRI", etc.) with negative sentiment.

Then, on a subsequent day, the message retriever may retrieve all of the tweets satisfying the query defined above (and, in embodiments, may retrieve such tweets periodically or continuously throughout the day) and analyze the tweets based on the learned sentiment features. That is, for example, the sentiment analyzer may analyze a set of tweets at noon and identify sentiments associated with each tweet based on the sentiment features it observes. Suppose, for example, that the sentiment analyzer analyzes 300 tweets having words and phrases such as "yuck", "no", and "bad", and 500 tweets having words and phrases such as "yes", "dynamite", and "good." In this case, the sentiment analyzer may identify 300 tweets having negative sentiment and 500 tweets having positive sentiment. In embodiments of the illustrative implementation, the sentiment analyzer may then aggregate these sentiments and calculate a sentiment score. The sentiment score may reflect, for example, the net percentage of tweets having a positive sentiment (i.e., +0.625).

This sentiment score may be used to form a prediction associated with the performance of Thomson Reuters stock on the following day such as, e.g., that the price of Thomson Reuters stock is predicted to increase the next day, not decrease the next day, increase slightly the next day, increase over the next couple of days, or the like. In this manner, for example, a trading strategy can be established based on the prediction. For example, if the stock is predicted to rise, the strategy may include taking a long position on the stock (e.g., buying or maintaining shares in the stock), whereas, if the stock is predicted to fall, the strategy may include taking a short position in the stock (e.g., selling shares of the stock). According to embodiments, a classifier, or combination of classifiers, may be configured to learn from observations over time that if, e.g., a net percentage of tweets having a positive sentiment greater than a particular threshold (e.g., 0.625) are identified, the stock may be a strong "buy." Other similar observations regarding the strength of strategic decisions may be garnered by analyzing patterns in messages associated with various types of events.

Figure 3:
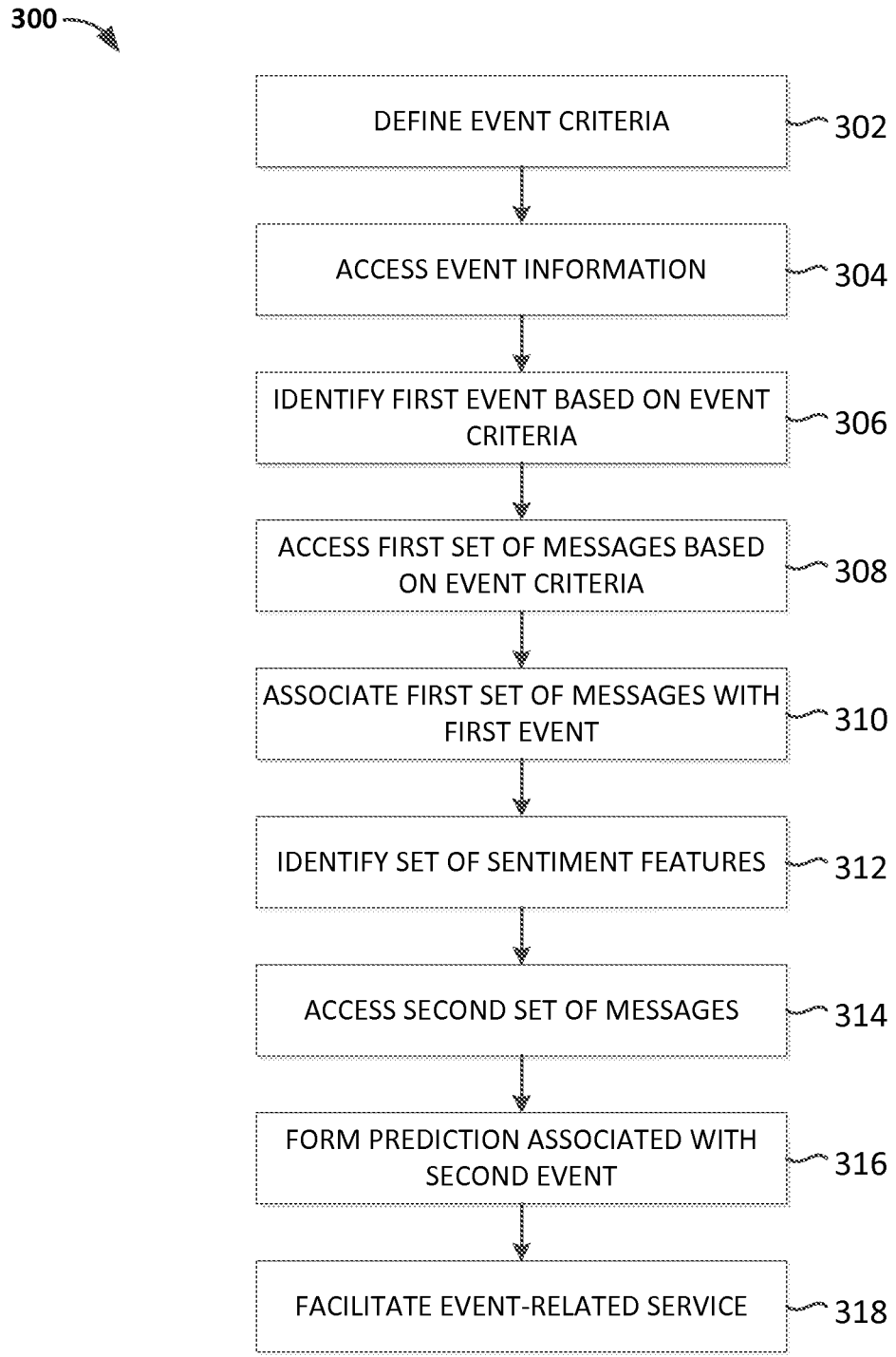
FIG. 3 is a flow diagram depicting an illustrative method of forming predictions associated with events in accordance with embodiments of the present invention.

As described above, a sentiment analyzer (e.g., the sentiment analyzer 108 shown in FIG. 1) may analyze messages to facilitate forming predictions associated with events. Results of the analyses may facilitate strategies and recommendations for actions associated with future occurrences of events such as, for example, performances of items or entities, which may be used to provide event-related services. FIG. 3 is a flow diagram depicting an illustrative computer-implemented method 300 for predicting events. Embodiments of the illustrative method 300 include defining event criteria (block 302) and accessing event information (block 304). In embodiments, a server (e.g., the server 102 shown in FIG. 1) may implement an event information retriever (e.g., the event information retriever 120 shown in FIG. 1) that retrieves, copies, or otherwise accesses content from an event information source (e.g., event information source 110 shown in FIG. 1). An extraction module (e.g., the extraction module 202 shown in FIG. 2), identifies, using the event information, a first event based on the event criteria (block 306). In embodiments, the first event may be a gain event associated with a stock price or a loss event associated with the stock price. For example, a gain event may be identified when a relative increase of the stock price during a period of time (e.g., a trading day) exceeds three percent more than a return associated with a stock market index and, similarly, a loss event may be identified when a relative decrease of the stock price during the period of time exceeds three percent less than the return associated with the stock market index.

As shown in FIG. 3, the content retriever accesses a first set of messages (block 308). The messages may be accessed based on the event criteria. That is, for example, accessed messages may correspond to a period of time specified by the event criteria, may include text satisfying a search query based on the event criteria, and/or the like. The messages may include any number of different types of messages such as, for example, social media messages, emails, SMS messages, blog posts, reply posts, web-published articles, and/or the like. An extraction module (e.g., the extraction module 202 shown in FIG. 2) associates the first set of messages with the first identified event (block 310). The sentiment analyzer identifies a set of sentiment features by analyzing the first set of messages (block 312). In embodiments, the sentiment analyzer may analyze messages by implementing one or more statistical classifiers configured to learn sets of sentiment features associated with the first event such as, for example, phrases, words, characters, special notations, and/or combinations or patterns of these. In embodiments, the sentiment analyzer may use regression analysis, word lists, or other techniques for analyzing messages to learn sentiment associated with the event. The analysis may be enhanced using autoregressive models, error-compensation techniques, normalization, and/or other techniques for refining the predictive power of the resulting sets of sentiment features.

Embodiments of the method 300 further include accessing a second set of messages (block 314) and, using the set of sentiment features, forming a prediction associated with a second event (block 316). The prediction may be a prediction of an occurrence of a future event, a prediction of a consequence of an occurrence of a future event, a prediction of an amount of return associated with an occurrence of a future event, a prediction of a result of an occurring event, and/or the like. An event-related service may be provided based on the prediction (block 318).

Figure 4:
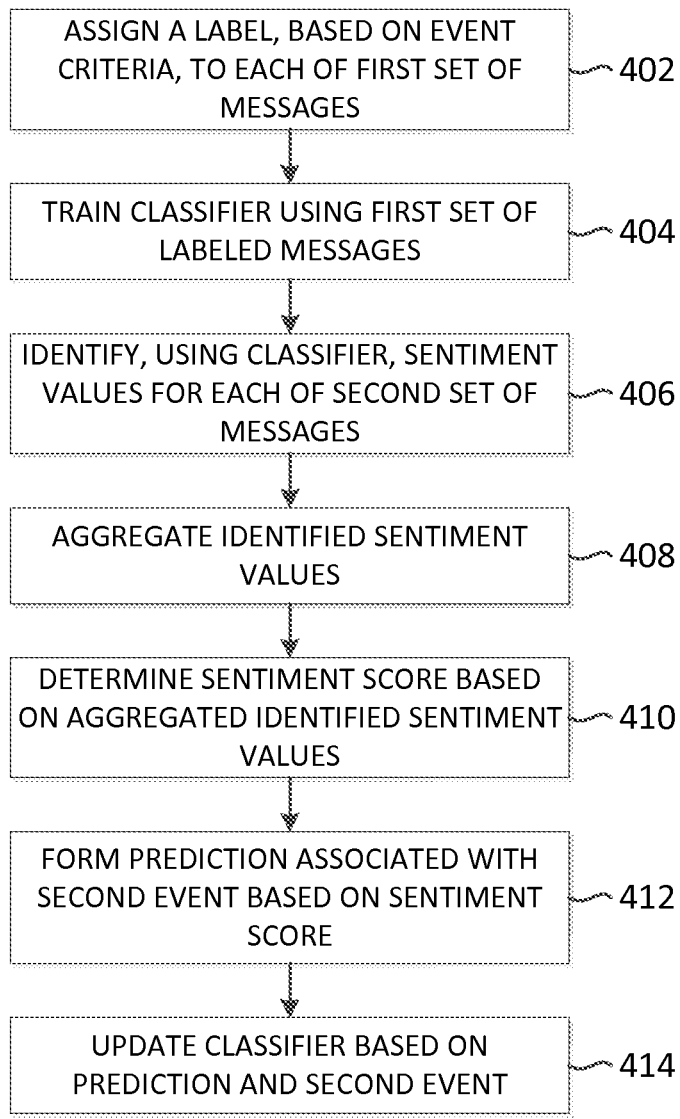
FIG. 4 is another flow diagram depicting an illustrative method of utilizing a supervised classifier to form predictions associated with events in accordance with embodiments of the present invention.

Additional, alternative and overlapping aspects thereof for predicting events as contemplated by embodiments of the present invention are depicted in FIG. 4. As described above, a sentiment analyzer (e.g., the sentiment analyzer 108 shown in FIG. 1) may utilize supervised classifiers to identify sets of sentiment features that can be used to form predictions associated with events such as, for example, events related to a securities market. FIG. 4 is a flow diagram depicting an illustrative computer-implemented method 400 for utilizing a supervised classifier to form predictions associated with events, where the classifier is trained using automatically generated training data extracted from a first identified event and a first set of accessed messages. Embodiments of the illustrative method 400 include assigning a label, based on event criteria, to each of the first set of messages (block 402). For instance, in the securities example, assigning the label to each of the first set of messages may include labeling each of the first set of messages as positive when the first event is a gain event, and labeling each of the first set of messages as negative when the first event is a loss event.

The sentiment analyzer trains one or more classifiers using the first set of labeled messages (block 404). Upon accessing a second set of messages, the sentiment analyzer uses the classifier to identify sentiment values for each of the second set of messages (block 406) and aggregates the identified sentiment values (block 408). Based on the aggregated identified sentiment values, a sentiment score is determined (block 410). For example, the identified sentiments may be positive and negative signs and the sentiment score may be, or include, an indication of the net sentiment. That is, if there are more positive signs than negative sings in the aggregated identified sentiments, the sentiment score may be, or include, a positive sign. In embodiments, the sentiment score may include magnitudes, weightings, and/or any number of additional types of factors such as error terms, confidence levels, probability estimations, and the like. For example, in embodiments, the sentiment score may be a number, S, such that $-1 \leq S \leq 1$. In this example, the sign (+ or −) indicates the net quality of sentiment (positive or negative, respectively), while the number indicates the net quantity (e.g., level) of sentiment (e.g., where −1 indicates substantially negative sentiment, 0 indicates neutral sentiment, and +1 indicates substantially positive sentiment). In embodiments, the sentiment analyzer implements a prediction module (e.g., the prediction module 208 shown in FIG. 2) that aggregates the sentiment values and determines the sentiment score. As shown in FIG. 4, the prediction module forms a prediction, based on the sentiment score, associated with a second event (block 412). Additionally, in embodiments, the sentiment classifier 204 may be updated based on the prediction and subsequently accessed information associated with the second event (block 414).

While embodiments of the present invention are described with specificity, the description itself is not intended to limit the scope of this patent. For example, while embodiments related to predicting movements of stock prices have been described herein, as indicated previously, embodiments of the invention may be used in forming predictions associated with various types of events that involve quantifiable characteristics and that affect, or are affected by, public sentiments. For instance, embodiments of the invention may be used to form predictions, based on learned sentiment, associated with real estate markets, product markets, financial markets (e.g., insurance markets), legal markets, and/or the like. Additionally, embodiments of the invention may enable customizable analysis components such as, for example, components that allow users to provide input for making assumptions, considering certain variables, selecting event criteria, and/or the like. Thus, the inventors have contemplated that the claimed invention might also be embodied in other ways, to include different steps or features, or combinations of steps or features similar to the ones described in this document, in conjunction with other technologies.

The following is claimed:

1. A computer-implemented method for forming and applying a prediction associated with an event, the method comprising:
    building a dynamic dictionary by:
        accessing, using a computing device having a processor and a memory, event information from an event information source,
        identifying, using the processor and the event information, a first event, wherein the first event comprises either a gain event associated with a stock price of a stock or a loss event associated with the stock price, wherein the first event is a gain event when the event information indicates a relative increase of the stock price that exceeds a predetermined return associated with a market index, and wherein the first event is a loss event when the event information indicates a relative decrease of the stock price that exceeds a predetermined loss associated with the market index,
        accessing, using the computing device, a first set of messages from a message source, wherein the first set of messages is generated by a plurality of messaging users before the first event occurred,
        associating, using the processor, the first set of messages with the first event,
        assigning a label to each of the first set of messages to create a first set of labeled messages, wherein the label corresponds to a predetermined sentiment value,
        training a classifier using the first set of labeled messages,
        determining, using the processor and the classifier and based on whether the first event is a gain event or loss event, that a text feature of each message associated with the first event includes a positive or negative sentiment, respectively, and
        storing the sentiment-associated text features in the dynamic dictionary in the memory;
    accessing, using the computing device, a second set of messages associated with a second event from the message source;
    computing, using the processor and dynamic dictionary of sentiment-associated text, an aggregate sentiment score for the second set of messages;
    predicting, using the processor and aggregate sentiment score, a positive or negative event;
    taking a long position with respect to the stock if the second event comprises a gain event; and
    taking a short position with respect to the stock if the second event comprises a loss event.

* * * * *